Patented Feb. 8, 1944

2,341,464

UNITED STATES PATENT OFFICE 2,341,464

CELLULOSE ESTER COMPOSITION

Lester W. A. Meyer, Kingsport, Tenn., assignor to Eastman Kodak Company, Rochester, N. Y., a corporation of New Jersey No Drawing. Application May 29, 1941, Serial No. 395,819

11 Claims. (Cl. 106—180)

This invention relates to a composition of 100 parts of a stable butyric acid ester of cellulose containing 30–55% butyryl and 1–2 free hydroxyl groups per 24 cellulose carbon atoms and 5–30 parts of a plasticizer, at least 45% of which is ethylene glycol dicaprate.

Ethylene glycol dicaprate is compatible only to a very small extent with commercial cellulose acetate, and, therefore, has no utility for plasticizing that ester. In contrast to its action with cellulose acetate, ethylene glycol dicaprate is compatible in various proportions with stable butyric acid esters of cellulose, having a butyryl content of at least 30% and 1–2 free hydroxyls per 24 cellulose carbon atoms, and gives compositions with those cellulose esters of a plastic nature which are characterized by toughness, good resistance to the effects of water and weather and are readily worked up into commercial products.

An object of my invention is to provide plastic compositions of value in the making of plastic products, particularly those of a molded nature. Other objects of my invention will appear herein.

I have found that the combination of 100 parts of a stable cellulose acetate butyrate, having a butyryl content of 30–55%, 1–2 free hydroxyls per 24 cellulose carbon atoms and a viscosity of 5–75 seconds (1 : 4 acetone) with 5–30 parts of plasticizer, at least 45% of which is ethylene glycol dicaprate, forms a thermoplastic composition from which molded products can be made having high permanence by reason of high resistance to moisture and leaching and which are easily molded due to good flow and sealing characteristics. By reason of high resistance to moisture and leaching, there is little, if any, tendency to warping, shrinking, discoloration, loss of strength or the like in the products prepared from compositions in accordance with my invention. Also, the compositions, in accordance with my invention, have good flow, good wet strength, good resistance to hot water, uniformity in strength with variation of temperature and sharp melting characteristics.

The cellulose esters, which I have found to be most suitable for use in compositions in accordance with my invention are stable as evidenced by a char point of at least 260° C. and preferably approximately 300° C. The esters, which I have found to be most suitable in my compositions, are cellulose acetate butyrates having a butyryl content of 30–55%, which have been slightly hydrolyzed, such as from ¼ to ½ of the way down to the diester or, in other words, having about 1–2 hydroxyls per 24 cellulose carbon atoms. Cellulose acetate butyrates are the esters with which I have principally worked and as these esters, containing substantially no other acyl groups than acetyl and butyryl, have proven to be quite satisfactory, it is to these esters that my invention is particularly directed. The invention, however, includes within its scope organic acid esters of cellulose containing 30–55% of butyryl and the hydroxyl content designated. The remainder of the acyl present may be any fatty acid radical of at least two carbon atoms.

The cellulose esters, which I have employed, have been made by reacting upon cellulose with a reaction mixture in which butyric anhydride is employed, because to obtain high butyryl esters, it is ordinarily necessary to use mainly butyric anhydride as the anhydride in the reaction mixture. These esters may be prepared as described in U. S. Patent No. 2,250,201 of Malm and Kirton, dated July 22, 1941, or Malm application Serial No. 378,249, filed February 10, 1041. My invention is restricted to the use of esters which have been stabilized in accordance with the Malm and Kirton process, as described in their application referred to above, or which have a stability which is equivalent to that of esters prepared according to that process (that is with a char point of at least 260° C. and preferably 300° C. or more). Another method of stabilizing the cellulose esters, which may be used, is the two-phase stabilization method described and claimed by Malm and Crane in their application Serial No. 382,584, filed March 10, 1941. An ester, which has been found to be particularly satisfactory in my invention is one having a butyryl content of 35–38%, substantially the remainder of the acyl being acetyl, which has been hydrolyzed approximately one-third of the way down to the diester (1½ free hydroxyls per 24 carbon atoms in the cellulose unit) and which has a char point of at least 280° C.

The ethylene glycol dicaprate plasticizer is mixed with 100 parts of the cellulose ester in an amount between 5 and 30 parts. The proportion of plasticizer to cellulose ester ordinarily determines the flow characteristics of the composition. As molding compositions range all the way from extremely hard to extremely soft, the proportion of plasticizer used is governed by the use to which the composition is to be put. Ordinarily, in molding processes of the injection type, a molding composition, having what may be termed medium soft characteristics, is most suitable for ease of operation. For a composition of this type, a proportion of plasticizer, in accordance with my invention, between 15 and 20 parts per 100 parts of cellulose ester is used. In compression molding, compositions of medium soft or soft flow are ordinarily the easiest to use. For these compositions a proportion of approximately 20 parts of plasticizer to 100 parts of cellulose ester is employed. If molding compositions having harder characteristics are desired, smaller proportions of the plasticizer should be employed in the composition. For instance, proportions of plasticizer, ranging from 15 down to 10 parts per 100 parts of cellulose ester, range from medium to hard, while the range for molded compositions, having hard characteristics, is from 10 down to 5 parts of the plasticizer per 100 parts of cellulose ester, the compositions having near to 5 parts of plasticizer being extremely hard and having higher flow temperatures than the plastic compositions having flow characteristics designated as medium or soft. If the desired degree of softness is not imparted to the plastic composition by the use of 20 parts of the plasticizer therein for 100 parts of the cellulose ester, the amount of plasticizer may be increased up to as much as 30 parts of plasticizer. Plastic compositions become increasingly soft and have lower flow temperatures as the amount of plasticizer is increased and vice versa.

In view of the valuable plasticizing effect of ethylene glycol dicaprate, other plasticizers may be mixed therewith in amounts up to 55% without detracting from the composition. For instance, a mixture of equal parts of ethylene glycol dicaprate and dibutyl phthalate has been employed for plasticizing butyryl cellulose esters of the type described herein and the resulting product has had high moisture resistance and good plasticity. The addition of a plasticizer, which is not a fatty acid ester with the ethylene glycol dicaprate usually improves the characteristics of the plastic composition. Examples of plasticizers, which appear to supplement the action of the ethylene glycol dicaprate and to improve its characteristics, are diethyl phthalate, dibutyl phthalate, diamyl phthalate, triphenyl phosphate, tributyrin and tricresyl phosphate. These auxiliary plasticizers are particularly valuable for use in plastic compositions of the soft-flow type, as by their use, supplemental to the ethylene glycol dicaprate, the resulting melted products obtained seem to be harder and of even greater permanence than where ethylene glycol dicaprate is employed alone. These auxiliary plasticizers may be employed with the ethylene glycol dicaprate in any proportion up to 55% of the plasticizer mixture.

The plastic compositions of my invention are characterized by toughness as compared to the cellulose ester plastic compositions usually disclosed in the prior art. The toughness of plastic compositions is evidenced by good impact strengths and high elongation values. Impact strengths are ordinarily measured in a testing machine for that purpose, the modification of the machine employed for the test depending upon whether the Charpy or Izod test is to be conducted. Plastic compositions in accordance with my invention using parts of plasticizer ranging from 5 to 30 per 100 parts of cellulose acetate butyrate have shown high impact strengths tested by both the Charpy and the Izod methods. This is true both of the compositions in which ethylene glycol dicaprate was the sole plasticizer and those in which ethylene glycol dicaprate was mixed with other plasticizers in various proportions within the limits of my invention.

The elongation of the plastic is measured by the distance that a strip of the plastic is stretched before it is ruptured. This value is obtained in the test of the plastic for tensile strength. Whereas compositions of high butyryl cellulose acetate butyrate plasticized with various values within the range of 5-30 parts of plasticizer per 100 parts of cellulose ester, using common plasticizers such as dibutyl phthalate or triphenyl phosphate alone give elongation values on the order of 10-25%, the compositions in accordance with my invention have been found to give elongation values within the range of 28-130%, with the average taken from various proportions of plasticizer and under both wet and dry conditions being approximately 65%.

It is desirable that the plastic compositions, in accordance with my invention, be substantially free of moisture, such as not more than .5% at the time of molding, for best results. The plastic compositions of my invention may take the physical form most suited for the use to which they are to be put. For instance, they may be in the form of sheets, slabs, granules or powder. If desired, materials may be added to my plastic compositions to give various effects. Some of the materials which may be added are suitable coloring materials, such as dyes, pigments, parts of colored material, metallic particles or the like. Thermoplastic compositions, in accordance with my invention, can be suitably prepared by the hot roll process described in Conklin Patent No. 2,048,686, of July 28, 1936 or by that described in the Conklin Patent No. 2,155,303 of April 18, 1939.

A composition, in accordance with my invention, was prepared by mixing together slightly hydrolyzed cellulose acetate butyrate having a butyryl content of 37.5%, an acetyl content of 13% and a char point of 295° C. and approximately 14 parts of a plasticizer consisting of equal parts of ethylene glycol dicaprate and dibutyl phthalate. The mass was then subjected to kneading on rolls having a temperature within the range of 275-325° F. which aids in thoroughly incorporating the plasticizer to convert the whole to a completely homogeneous mass. The plasticized sheet, thus prepared, may be directly worked up, such as by pressing upon a hot platen press or in a mold, or it may be cut up into strips for molding into desired shapes, or it may be cooled and broken or granulated into small particles which may be molded in much the same manner as molding powders. The tensile strength of the molded material was determined as approximately 5600 lbs. and the wet tensile strength was approximately 4000 lbs. The flexural strength of the product was determined as approximately 6600 lbs. and the wet flexural strength was approximately 5000 lbs. The Rockwell hardness of the products was 69.4. With decrease of plasticizer, such as the use of 8 parts, the Rockwell hardness of the product tested 80.6 and both the tensile strengths and flexural strengths were higher. With increase of plasticizer, the hardness, tensile strengths and flexural strengths of the product are less but the flow of the plastic composition is accomplished at a lower temperature. For instance, using equal parts of ethylene glycol dicaprate and dibutyl phthalate, 21 parts of plasticizer gave a product having a Rockwell hardness of 55.4 while 30 parts of that plasticizer gave a product having a hardness of 35.

The above example was duplicated except that the plasticizer employed consisted of 75% ethylene glycol dicaprate and 25% of dibutyl phthalate. The Rockwell hardness of the product, using 14 parts plasticizer, was 69.4, the tensile strength was approximately 5400 lbs. dry and approximately 4500 lbs. wet. The flexural strength was approximately 6600 lbs. dry and 5100 lbs. wet. Here again, with decrease of plasticizer, the hardness is increased, while with increase of plasticizer, the hardness, tensile and flexural strenghts are decreased. Using 8 parts of this plasticizer, a product was obtained having a Rockwell hardness of 81.2 and tensile and flexural strengths greater than with the use of 14 parts of plasticizer. Using 21 parts of this plasticizer, the Rockwell hardness was 51.4 and with 30 parts plasticizer, was 39.4. The tensile and flexural strengths also were smaller with the larger amounts of plasticizer. Instead of using equal parts of ethylene glycol dicaprate and auxiliary plasticizer or three parts of ethylene glycol dicaprate to one of auxiliary plasticizer, other proportions of the dicaprate and auxiliary plasticizer may be employed, providing the dicaprate constitutes at least 45% of the plasticizer mixture. For instance, other plasticizer mixtures, which may be employed, are the following:

|  | Per cent |
|---|---|
| Ethylene glycol dicaprate | 45 |
| Dibutyl phthalate | 55 |
| Ethylene glycol dicaprate | 63 |
| Dibutyl phthalate | 37 |
| Ethylene glycol dicaprate | 88 |
| Dibutyl phthalate | 12 |

These plasticizer mixtures are merely illustrative to show that any plasticizer mixture, containing at least 45% of ethylene glycol dicaprate, the remainder being essentially a plasticizer, preferably not a fatty acid ester, may be employed. For instance, in the above examples, diamyl phthalate, triphenyl phosphate or any of the other auxiliary plasticizers mentioned herein may be employed instead of the dibutyl phthalate or in admixture therewith.

The above example was repeated except that ethylene glycol dicaprate was employed without the addition of any other plasticizer. Using 15 parts of ethylene glycol dicaprate, a product was obtained having a Rockwell hardness of 60.4, a tensile strength of 4750 lbs. dry and 3900 lbs. wet and a flexural strength of 6500 lbs. dry and 5100 lbs. wet. As was illustrated with the plasticizers above mentioned, it is also true when using ethylene glycol dicaprate alone that with less amounts of plasticizer, products, having a higher Rockwell hardness and greater tensile strengths, are obtained and vice versa. For instance, using 10 parts of ethylene glycol dicaprate as the only plasticizer therein, a product, having a Rockwell hardness of 72.2, was obtained, while with 5 parts, a product, having a Rockwell hardness of 81, was obtained. Using greater amounts of plasticizer, such as 20 parts, a product, having a Rockwell hardness of 50.6 resulted and with 30 parts of plasticizer, the hardness of the resulting product was 27. The tensile and flexural strengths also diminished with increased proportions of plasticizer.

A molding composition was prepared in a manner similar to the examples given above using a stable, slightly hydrolyzed butyric acid ester of cellulose having a butyryl content of approximately 50% and a char point of approximately 300° C. and approximately 5 parts of a mixture of ethylene glycol dicaprate and dibutyl phthalate in equal parts. A homogeneous mass, eminently suitable for the manufacture of molded products, was obtained.

A stable cellulose acetate butyrate, having a butyryl content of 32% and containing 1½ free hydroxyls per 24 carbon atoms in the cellulose unit, was mixed with approximately 20 parts of a mixture of equal parts of ethylene glycol dicaprate and triphenyl phosphate to form a completely homogeneous mass by working up with hot rolls. The resulting composition was eminently suitable for the manufacture of molded products.

A stable, slightly hydrolyzed cellulose acetate butyrate, having a butyryl content of 37.5%, an acetyl content of 13% and a char point of 295° C., mixed with approximately 28 parts of a mixture of 75% ethylene glycol dicaprate and 25% tributyrin, was kneaded on hot rolls. A homogeneous mass, suitable for the manufacture of molded products, was obtained.

The thermoplastic compositions, in accordance with my invention, have good permanence, and, therefore, should be substantially free from substances which will have unstabilizing tendencies, such as resins. The presence of volatile solvents is not necessary or even desirable to assure a satisfactory composition for the manufacture of molded products of good quality.

Compositions in accordance with my invention may be employed for making various molded articles, such as those for which cellulose acetate plastics have heretofore been used. In addition, my plastic compositions are particularly adapted to the making of objects which are exposed to water or weather, such as toothbrush handles, artificial fish baits, exterior fittings for automobiles and the like. When made from my thermoplastic compositions, these objects exhibit good permanence due to their resistance to water, weather and moderate heat.

The tensile strength of the various products referred to above was determined by testing specimens having dimensions of 5″ x ½″ x 0.2″ with the middle section ground down to ⅜″. The dry tensile strength is given as the force required to break the dry specimen by extension, the unit being pounds per square inch. To determine the wet strength, the specimen was immersed in water at room temperature until saturated. Tests were made with an Olsen hydraulic testing machine. The wet tensile strength is the force required to break the specimen by extension while wet.

The flexural strength may be defined as the resistance of a specimen to breakage when a force is applied tending to bend a body. The flexural strengths of specimens 5″ x ½″ x 0.2″ were determined on an Olsen tester, the wet strengths being determined after the specimens had been saturated with water.

The plastic compositions, in accordance with my invention, showed very little loss of plasticizer by leaching. This was determined by keeping a pressed sample of predetermined weight in water at 75° F. for about 48 hours, then removing, drying and weighing, and calculating the per cent loss therefrom. They were found to take up but a small amount of water upon immersion for 48 hours at room temperature and the gain in weight at 80% relative humidity was small in every case. Heating of dry specimens of various plastic compositions, in accordance with my invention, in a dry atmosphere at 150° F. for 48 hours resulted in a relatively small loss of weight.

As pointed out above, molded products, in accordance with my invention, are also suitable for use under severe conditions, such as when the products are exposed to water and weather. This includes not only moderate heat and humidity but also the effect of ultraviolet and infrared rays. Due to the high permanence of these products, there is no deterioration in their extended use.

If desired, compositions, such as described herein, may be dissolved in volatile solvents and coated out in the form of sheets of good plasticity. It is to be understood that the compositions described herein are useful in various types of thermoplastic processes including those in which the molten compositions are extruded to give elongated products having the form of reeds, sticks, filaments, strips or the like.

It is to be understood that the results obtained by the physical tests as listed herein are illustrative and indicative rather than being absolute, and may vary to some extent from one instance to the next.

I claim:

1. A composition of matter comprising 100 parts of a stable slightly hydrolyzed fatty acid ester of cellulose containing at least 30% of butyryl and about 1-2 free hydroxyl groups per 24 cellulose carbon atoms and 5-30 parts of a plasticizer, at least 45% of which consists of ethylene glycol dicaprate.

2. A composition of matter comprising 100 parts of a stable slightly hydrolyzed cellulose acetate butyrate having a butyryl content of 35-38% and about 1-2 free hydroxyl groups per 24 cellulose carbon atoms and 5-30 parts of a plasticizer, at least 45% of which consists of ethylene glycol dicaprate.

3. A composition of matter comprising 100 parts of a stable slightly hydrolyzed butyric acid ester of cellulose containing approximately 50% of butyryl and about 1-2 free hydroxyl groups per 24 cellulose carbon atoms and 5-30 parts of a plasticizer, at least 45% of which consists of ethylene glycol dicaprate.

4. A composition of matter having moderately soft flow comprising 100 parts of a stable slightly hydrolyzed fatty acid ester of cellulose containing at least 30% of butyryl and about 1-2 free hydroxyl groups per 24 cellulose carbon atoms and 15-20 parts of a plasticizer, at least 45% of which consists of ethylene glycol dicaprate.

5. A composition of matter comprising 100 parts of a stable slightly hydrolyzed fatty acid ester of cellulose containing at least 30% of butyryl and about 1-2 free hydroxyl groups per 24 cellulose carbon atoms and 5-30 parts of ethylene glycol dicaprate.

6. A composition of matter comprising 100 parts of a stable slightly hydrolyzed fatty acid ester of cellulose containing at least 30% of butyryl and about 1-2 free hydroxyl groups per 24 cellulose carbon atoms and 5-30 parts of a plasticizer consisting of ethylene glycol dicaprate and a plasticizer auxiliary thereto, the ethylene glycol dicaprate comprising at least 45% of the plasticizer.

7. A composition of matter comprising 100 parts of a stable slightly hydrolyzed fatty acid ester of cellulose containing at least 30% of butyryl and about 1-2 free hydroxyl groups per 24 cellulose carbon atoms and 5-30 parts of a plasticizer consisting of ethylene glycol dicaprate and a dialkyl phthalate, the ethylene glycol dicaprate comprising at least 45% of the plasticizer.

8. A composition of matter comprising 100 parts of a stable slightly hydrolyzed fatty acid ester of cellulose containing at least 30% of butyryl and about 1-2 free hydroxyl groups per 24 cellulose carbon atoms and 5-30 parts of a plasticizer consisting of ethylene glycol dicaprate and a dibutyl phthalate, the ethylene glycol dicaprate comprising at least 45% of the plasticizer.

9. A composition of matter comprising 100 parts of a stable slightly hydrolyzed fatty acid ester of cellulose containing at least 30% of butyryl and about 1-2 free hydroxyl groups per 24 cellulose carbon atoms and 5-30 parts of a plasticizer consisting of approximately equal parts of ethylene glycol dicaprate and dibutyl phthalate.

10. A composition of matter comprising 100 parts of a stable slightly hydrolyzed cellulose acetate butyrate containing 35-38% butyryl and about 1-2 free hydroxyl groups per 24 cellulose carbon atoms and 15-20 parts of a plasticizer consisting of 45-75% ethylene glycol dicaprate the remainder being principally a dialkyl phthalate.

11. A composition of matter comprising 100 parts of a stable slightly hydrolyzed cellulose acetate butyrate containing 35-38% butyryl and about 1-2 free hydroxyl groups per 24 cellulose carbon atoms and 15-20 parts of a plasticizer consisting of 45-75% ethylene glycol dicaprate the remainder being principally dibutyl phthalate.

LESTER W. A. MEYER.